Aug. 27, 1974  H. N. SHEARER  3,832,201

PROCESS FOR MAKING ASPHALT PAVING COMPOSITIONS

Filed Nov. 3, 1972  3 Sheets-Sheet 3

3,832,201
PROCESS FOR MAKING ASPHALT PAVING
COMPOSITIONS
Herbert N. Shearer, Everett, Wash., assignor to
Pavement Systems, Inc., Seattle, Wash.
Continuation-in-part of application Ser. No. 167,702,
July 30, 1971, which is a continuation-in-part of Ser.
No. 60,284, Aug. 3, 1970, both now abandoned. This
application Nov. 3, 1972, Ser. No. 303,309
Int. Cl. B28c 5/06; C08h 13/00, 17/02
U.S. Cl. 106—281                                6 Claims

ABSTRACT OF THE DISCLOSURE

Particulate emissions during production of asphalt concrete are controlled by contacting wet aggregate with an asphalt composition at or before introduction of the aggregate into a heated mixing and drying zone wherein the asphalt-aggregate mixture is moved through a relatively high velocity, heated gas stream in the mixer flowing parallel to the direction of movement of the asphalt mixture through the mixing and drying zone. The process, in addition to control of particulate emissions, results in less damage to the asphalt due to aging or hardening, and the ability to achieve a more uniform mixture compaction of the said asphalt concrete because the parallel flow enables more uniform temperature control of the asphalt and aggregate mixture on discharge from the mixing and drying zone. Means for automating production of the paving compositions are disclosed.

CROSS REFERENCE TO RELATED APPLICATIONS

This application is a continuation-in-part of Ser. No. 167,702, filed July 30, 1971, which is a continuation-in-part of Ser. No. 60,284, filed Aug. 3, 1970 both now abandoned.

BACKGROUND OF THE INVENTION

Field of the Invention

This invention relates to an improved process and apparatus for producing asphalt-concrete.

Prior Art Relating to the Disclosure

Bituminous pavements of the plant mix type have generally been produced by drying aggregate in a drum dryer, feeding the dried aggregate into a screening unit capable of separating the dried aggregate into fractions held in a series of storage bins, feeding the fractions in proportioned amounts from the bin units, and mixing the proportioned amounts with a predetermined amount of bituminous composition in a mixing unit of the pug mill type. The drum dryers used to dry the aggregate are generally heated by a forced air burner. Particulate emissions from dryers of this type have posed a problem due to increasingly stringent air pollution regulations. Dust collectors of the "baghouse" type, costing thousands of dollars per plant, are presently the means used to control particulate emissions from drum dryers used in drying aggregate.

Asphalt paving compositions have heretofore been made in a continuous drum type mixing plant, as disclosed in U.S. Pats. Nos. 2,626,875 and 3,423,222, by feeding aggregate into the mixer, contacting it in the mixer with a bituminous composition in the form of an emulsion, and heating the mixture, during mixing of the aggregate and bituminous composition, with a heated gas stream flowing countercurrent to the flow of the aggregate-bituminous composition flow.

SUMMARY OR THE INVENTION

One of the objects of this invention is to provide a process and apparatus for making asphalt paving compositions wherein cold, wet aggregate is contacted with a liquefied asphalt composition just prior to or concurrently with introduction of the aggregate into a relatively high velocity, heated gas stream flowing parallel to the direction of the aggregate-asphalt mixture through a mixing and drying zone. In the heated atmosphere, the mixture of aggregate and asphalt is mixed while being heated to coat the aggregate particles with asphalt and the coated particles cascaded through the heated atmosphere to remove moisture therefrom without substantial aging or hardening of the asphalt. The asphalt-coated aggregate discharged from the heated atmosphere generally has a moisture content of less than 0.3% by weight.

Further objects of this invention are: (1) to provide a process for coating an unheated, wet aggregate with a liquefied asphalt; (2) to provide a process of coating aggregate with liquefied asphalt composition wherein the amount of air pollutants issuing from the mixing drum are minimized; (3) to provide a process of coating aggregate with liquefied asphalt wherein there is less adverse aging or hardening of the asphalt; (4) to provide an improved apparatus for production of an asphalt mixture, the apparatus having automatic controls for controlling the ratio of asphalt to aggregate entering the mixing and drying zone and for controlling the temperature of the asphalt coated aggregate discharged; (5) to provide a process and apparatus for making asphalt paving compositions at reduced capital cost and maintenance due to the use of less processing and mixing equipment; and (6) to provide an apparatus for making asphalt paving compositions wherein the heated air flowing through the mixing drum and the material flow therethrough are parallel, enabling marked reduction in particulate emissions, and production of an even-temperature discharge asphalt mixture making it possible to obtain more uniform compaction when the composition is laid.

DESCRIPTION OF THE PREFERRED EMBODIMENTS

Figure 1:
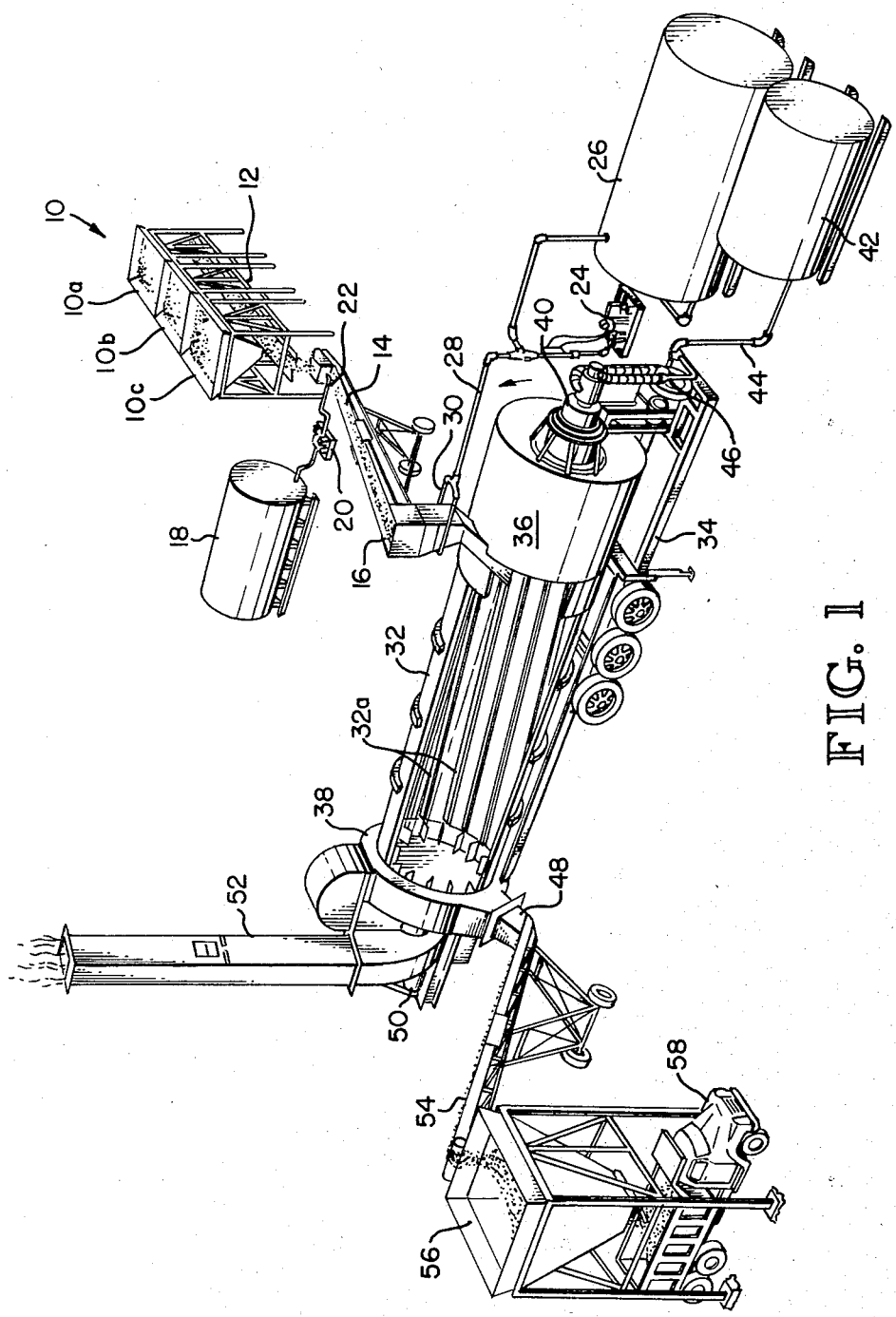
FIG. 1 is a schematic diagram of an asphalt plant employing the invention herein.

Referring to Fig. 1, aggregate is dumped into a plurality of bins 10a, 10b, and 10c of a compartmented cold feed bin unit feeding to a positive weight control device 12 which delivers accurate weights of cold aggregate onto a conveyor belt 14 running between the weight control means and chute 16 of a drum mixer. A weight control device which may be used is a Merrick Feedoweight, Model WLC, which has control gate screw setting and feed control settings. Accurate weights of feed according to the desired rate setting are delivered by means of powered feed regulators which automatically adjust the control feed gate without requiring the scale beam to do the work directly and without interfering with the sensitive response of the weighing mechanism of changes in load.

Figure 2:
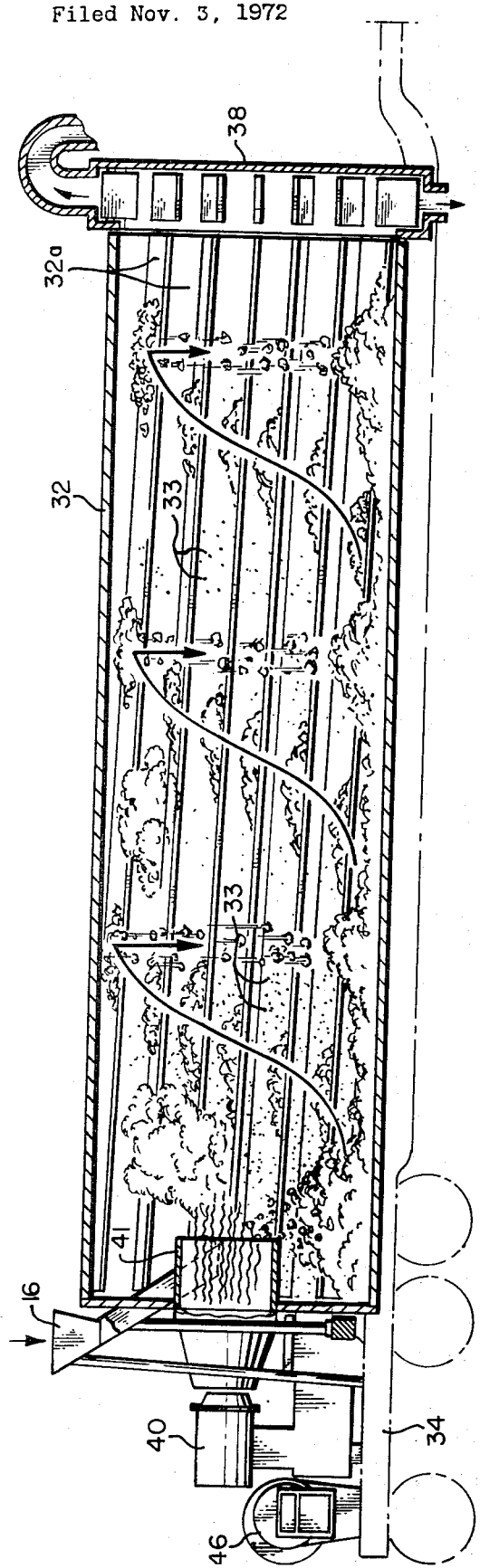
FIG. 2 is a vertical cross-sectional view of the mixing and drying drum of Fig. 4 illustrating parallel flow of the asphalt-aggregate mixture and high velocity, heated gas through the mixing and drying zone.
Figure 4:
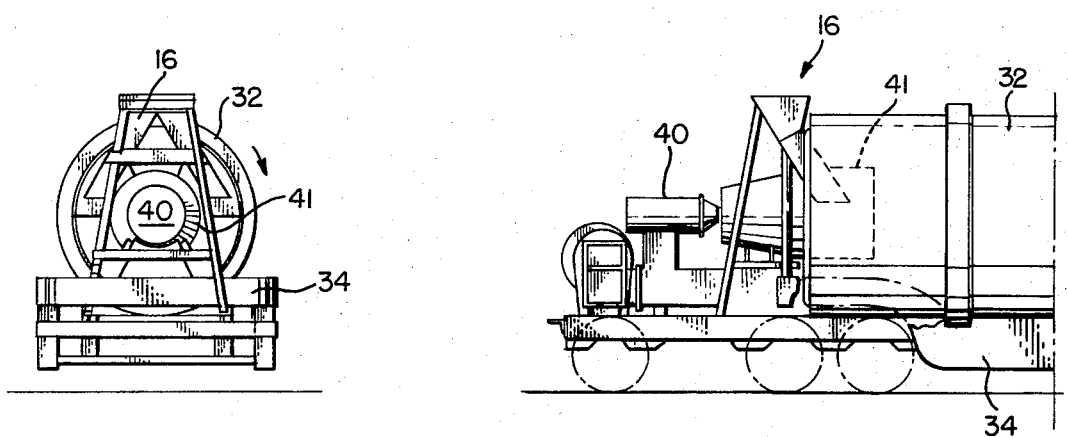
FIG. 4 is an end view and partial side elevation of a modified drum dryer wherein a shield extends into the mixing and drying zone from the burner to avoid flame contact with the asphalt-aggregate mixture.

With such a control system, any variations of load due to changes in material or density are instantly corrected by means of the automatic regulation of the feed The aggregate used need not be pre-conditioned, i.e., pre-dried or preheated. The aggregate should contain about 1–10% and preferably 3–5% water by weight based on the total weight of the mix. If the water content of the aggregate is not sufficient, as sensed by a suitable disposed moisture detector or by periodic random sample, additional water may be added. Water, if necessary, may be pumped by pump 20 to a spray bar 22 from a storage tank 18. Prior to the aggregate entering the drum mixer liquefied asphalt is metered onto the aggregate by a positive displacement pump 24 pumping the asphalt from a storage tank 26 through conduit 28 to a spray bar or nozzle 30 which sprays the asphalt across the width of the aggregate on the conveyor belt 14. The liquefied asphalt may be an untreated paving grade asphalt heated to pumping temperature (generally 200° F. to 350° F.), an emulsified asphalt or cutback asphalt. The drum mixer comprises an inclined cylindrical drum 32 supported for rotation about its axis on rollers (not shown), the rollers journalled for rotation to frame 34. The drum mixer is rotated by suitable power means (not shown). End covers 36 and 38 cover the charge and discharge ends of the drum, the covers secured to the frame 34. An opening in the charge end of the mixing drum receives chute 16, through which the asphalt-coated aggregate is directed. As illustrated by FIG. 1 the charge end cover 36 is several feet long with a gas or oil fired burner 40 axially disposed in the end thereof, the charge end cover lined on the interior with a refractory material. The burner 40 is moved back of the infeed chute 16 a sufficient distance to prevent direct flame contact with the entering asphalt-coated aggregate. Fuel, either gas or oil, is supplied from storage tank 42 through line 44 of the burner. A blower 46 supplies air to the burner. Rather than move the infeed chute ahead of the burner as illustrated by FIG. 1 the burner may have a tubular extension 41 or shield extending several feet into the drum mixer, as illustrated by FIGS. 2 and 4. In this instance the asphalt-aggregate mixture is introduced through chute 16 located directly above the burner. The chute is bifurcated to allow the asphalt-aggregate mixture to drop into the drum mixer on each side of the shield.

Figure 5:
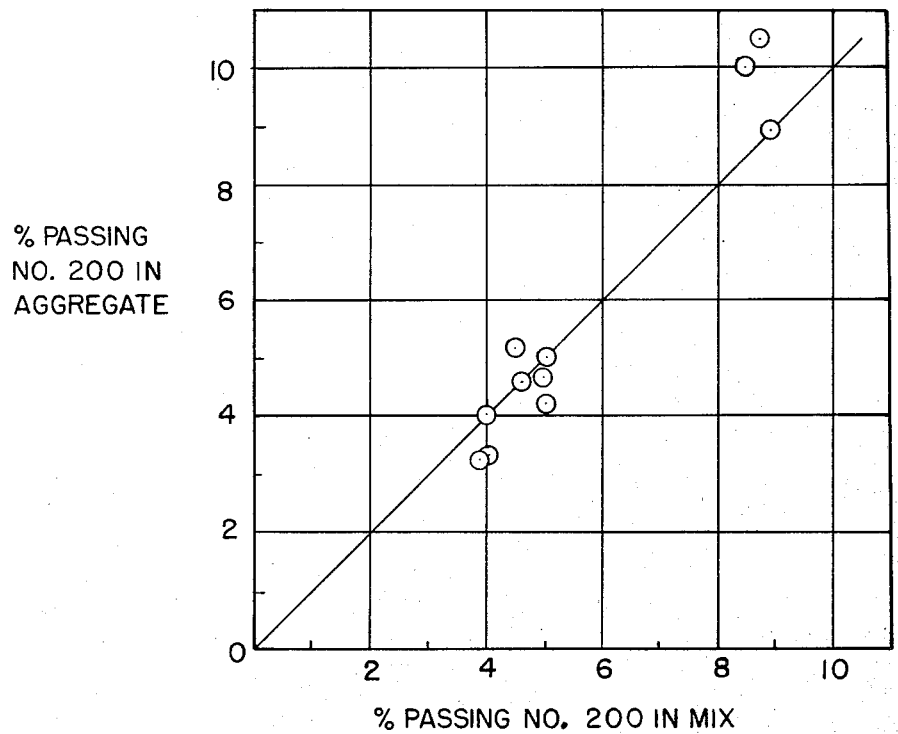
FIG. 5 is a comparison of the No. 200 material which was introduced with the aggregate into the mixing and drying zone with that retained in the discharged asphalt-aggregate mixture.

At the discharge end of the mixing drum is an exhaust opening and a material discharge chute 48. An exhaust fan 50, having a discharge stack 52 connected to the exhaust opening, maintains gas flow through the mixing drum at velocities ranging generally from 600 to 1500 feet per minute. The material flow and gas flow through the mixing drum are parallel. The interior of the drum mixer 32 is provided with flights 32a to mix the aggregate and asphalt as the mixture travels down the length of the dryer and to cascade the aggregate-asphalt mixture through the heated gas stream. FIG. 2 illustrates the "cascading" action of the rotating drum mixer and the parallel flow of heated gases and asphalt-aggregate mixture. The "fines" 33 in the aggregate which create an air pollution problem are apparently initially coated with the asphalt mixture and, entrained in the gas stream, flow through cascading curtains of asphalt aggregate the entire length of the drum mixer and apparently adhere to the larger pieces of aggregate. By capturing the "fines" in the aggregate early in the process there is little discharge of fines into the atmosphere. FIG. 5 is a graphical comparison of aggregate having varying percentages of "fines" passing through a No. 200 sieve that were introduced into the drum mixer with that retained by the mixture on discharge. The straight line indicates that the material introduced into the drum mixer came out in the asphalt-aggregate mixture and was not lost in the mixing process or was not discharged into the atmosphere. Asphalt-coated aggregate is discharged from the drum mixer through discharge chute 48 onto belt conveyor 54 which conveys the heated mix to a storage bin 56 where it is loaded into trucks 58 for transfer to a use location.

A completely automated control system for burner control, such as one sold under the trade name Genco Genie Burner Control System, is employed. Temperature sensing means are disposed to sense the temperature of the mix discharge or stack emission temperature, the sensing means operatively connected to a controller controlling the burner 40. Separate feed controls for the cold aggregate, asphalt, and water (if necessary) are also provided. The feed controls are preferably interlocked with one another. The feed control is of the type that controls aggregate blend and meters aggregate to the mixing drum so that the gradation and volume metered into the mixing drum are maintained essentially constant. The asphalt pump is a positive pump operatively connected to the feed control so that the gallons per minute of asphalt composition pumped into the mixing drum is maintained at a constant rate and at a predetermined weight ratio to the amount of aggregate metered into the mixing drum. Generally from 0.5% to 10% asphalt to aggregate on a weight basis is metered onto the aggregate. The asphalt-aggregate mixture is discharged from the mixing drum at a temperature of around 200° F. to 300° F. or even higher, and preferably at a temperature of 210° F. to 220° F.

Figure 3:
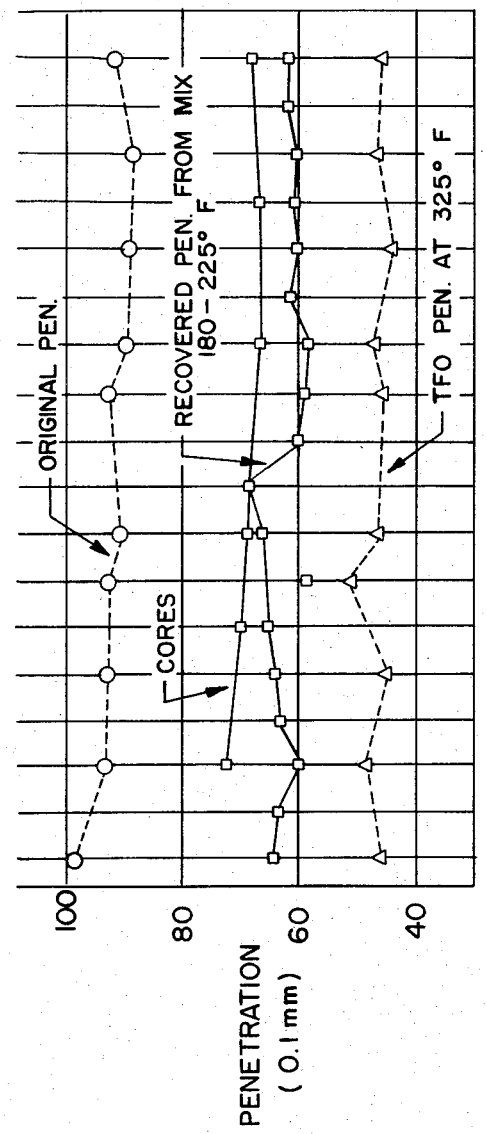
FIG. 3 is a graph of the range of penetration values measured from samples taken at various points in the production operation.

One of the major advantages of the process and apparatus of this invention is substantially complete elimination of air pollution caused by particulate emissions from the drum mixer without the need of installing and maintaining auxiliary equipment. The combination of parallel flow of the heated gas stream and an asphalt-aggregate mixture through the mixing and drying zone enables control of particulate emissions from the discharge stack. "Fines" in the aggregate must, of necessity, travel the length of the mixing and drying zone before discharge and, in so doing, travel through the cascading curtains of asphalt-coated aggregate to which the "fines" adhere. Parallel flow of the heated gas stream and asphalt-aggregate mixture through the mixing and drying zone also enables discharge of the mixture at a constant temperature, thereby giving a product with improved compaction characteristics. Another advantage of parallel flow of the heated gas stream and asphalt-aggregate through the mixing and drying zone is reduced loss of the penetration value of the asphalt due to oxidation and hardening caused by direct contact of the asphalt composition with the flame of the burner. FIG. 3 is a graph of penetration values for several day's operation of (1) asphalt in its original form, (2) asphalt as recovered from the mixture during processing, (3) asphalt from cores taken several days after laying of a roadway surface and (4) asphalt subjected to artificial aging and hardening by a standard test procedure, the thin film oven test. The graph indicates that the asphalt retained 73% of its original penetration (from cores) as compared to 51% after the thin film oven test. Consistent penetration values of the cores was also noted. Sufficient water is associated with the asphalt-aggregate mixture when introduced into the charge end of the mixing and drying zone adjacent the burner to protect the asphalt against adverse aging or hardening and loss of penetration value until the mixture is processed out of the flame area within the mixing and drying zone.

A drum dryer forty feet long and about ten feet in diameter powered for rotation by suitable power means is provided with a burner in the charge end and an exhaust fan in the discharge end opposite the burner. A stainless steel shield about four feet in diameter extends around the flame area of the burner and about four feet into the interior of the dryer. The drum dryer is provided with spiral flights extend from the charge end to a point where the visible flame of the burner diminishes, generally four to five feet. These flights are designed to quickly convey the asphalt-aggregate out of the flame zone of the burner. The flights following the spiral flights are segmented, staggered flights designed to mix the asphalt-aggregate mixture and extend three or four feet beyond the spiral flights. The flights following the segmented flights are straight flights as illustrated in FIG. 2 and extend to the discharge end of the drum dryer, these flights designed to cascade the asphalt-aggregate through the heated gas stream coursing through the drum mixer parallel to the movement of the asphalt-aggregate through the drum mixer.

Aggregate was conveyed through a chute located directly above the fire shield, as illustrated in FIG. 4. The aggregate was fed into the dryer on a thirty-six inch wide belt at the rate of about 450 tons per hour when the plant was balanced for optimum operation. The aggregate was ⅝ inch minus aggregate with about 65% passing a ¼ inch screen, 35% passing between ⅝ inch and ¼ inch screen, and 10% passing a No. 200 sieve. The aggregate had a moisture content of about 7 weight percent. As the aggregate dropped into the chute, a 200 to 300 pentration paving grade asphalt was sprayed onto the aggregate from a spray bar, the paving grade asphalt being previously heated to pumping temperature.

The asphalt-aggregate mixture entered the drum-dryer on both sides of the flame shield and was quickly conveyed by the spiral flights to a point within the dryer where the visible flame from the dryer substantially diminished, mixed by the second series of flights and cascaded through the heated gas stream to remove moisture therefrom and uniformly coat the aggregate with the asphalt. The asphalt-aggregate was discharged at a temperature of 220° F. to 225° F. On visual examination, the aggregate was totally coated with asphalt. The hot gases coursing in parallel direction to the material movement through the drum-dryer travelled through an expansion chamber, then into a four foot diameter pipe, and were discharged to the atmosphere at a temperature of 450° F. to 550° F. The exhaust fan pulling the air through the drum-dryer operated at about 80,000 cubic feet per minute and was powered by a 250 horsepower electric motor. The asphalt discharged had a moisture content of about 1% by weight and an asphalt content of about 6.5% by weight.

After the plant was balanced for optimum operation, there was no visual evidence of any dust emanating from the stack—only heat waves plus a slight tinge of blue air which dissipated within 100 yards of the stack.

The embodiments of the invention in which a particular property or privilege is claimed are defined as follows:

1. A continuous process for making asphalt paving compositions by coating of aggregate with a liquefied asphalt composition consisting of paving-grade asphalt or a cut-back asphalt wherein the process results in reduced discharge of aggregate fines into the atmosphere, the paving compositions having uniform compaction due to even temperature of the asphalt-coated aggregate on discharge, comprising:
   providing a confined travel path between a charge station and a discharge station wherein the liquefied asphalt composition-aggregate mixture is mixed to uniformly coat the aggregate with the liquefied asphalt composition,
   moving a high velocity, heated gas stream along the confined travel path from the charge station to the discharge station,
   conveying an unconditioned aggregate having about 1% to 10%—water based on the weight of the aggregate associated therewith to the charge station,
   contacting the aggregate with the liquefied asphalt composition prior to any substantial heating of the aggregate by the heated gas stream along the confined travel path, the liquefied asphalt composition initially adhering to and capturing the fines in the aggregate, and
   tumbling and cascading the aggregate-liquefied asphalt composition mixture through the heated gas stream along substantially the total length of the confined travel path of the mixture to complete coating of the aggregate with the liquefied asphalt composition and to remove moisture from the mixture without substantial hardening of the asphalt composition, the coated fines adhering to the larger asphalt-coated aggregate and not becoming entrained in the heated gas stream and discharged as an air pollutant.

2. The method of claim 1 wherein 0.5% to 10% of the liquefied asphalt composition based upon the total weight of the asphalt-aggregate mixture is applied to the aggregate.

3. The method of claim 2 wherein the liquefied asphalt has a temperature ranging from about ambient to 350° F. and the heated gas stream is caused to flow along the confined path at a rate of from 600 to 1500 feet per minute.

4. A continuous method for making asphalt paving compositions by coating of aggregate with a liquefied asphalt composition consisting of paving-grade asphalt heated to pumping temperature or a cut-back asphalt wherein the process results in less aging or hardening of the asphalt composition and reduced amounts of air pollutants resulting from discharge of fines associated with the aggregate into the atmosphere, the paving compositions having uniform compaction due to even temperature of the asphalt-coated aggregate on discharge, comprising:
   providing an inclined drum mixer having a confined travel path between an upper charge end and a lower discharge end,
   moving a heated gas stream along the confined travel path in the drum mixer from the upper charge end to the lower discharge end at a rate of from 600 to 1500 feet per minute,
   conveying an unconditioned aggregate at substantially ambient temperature having about 1% to 10% water based on the weight of the aggregate associated therewith to the charge end of the drum mixer,
   contacting the conveyed aggregate with the liquefied asphalt composition substantially simultaneously on introduction of the conveyed aggregate into the charge end of the drum mixer, the liquefied asphalt composition initially capturing the fines in the aggregate, and
   tumbling and cascading the aggregate-liquefied asphalt mixture through the heated gas stream along substantially the total length of the confined travel path of the mixture to uniformly coat the aggregate with the liquefied asphalt composition and to remove moisture from the mixture without substantial hardening of the asphalt composition, the fines associated with the aggregate adhering to larger asphalt-coated aggregate and not becoming entrained in the heated gas stream for discharge as an air pollutant.

5. The method of claim 4 wherein the gas stream is heated by combusting an air-fuel mixture at the charge end of the drum mixer, wherein the hot combustion gases are caused to move at a realtively high velocity along the confined path and wherein the aggregate and liquefied asphalt are introduced into the charge end of the drum mixer to avoid direct contact with the flame of the combusted fuel-air mixture.

6. A continuous method for making asphalt paving compositions by coating of aggregate with a liquefied asphalt composition consisting of paving-grade asphalt heated to pumping temperature or a cutback asphalt wherein the process results in less aging or hardening of the asphalt composition and reduced amounts of air pollutants due to discharge of fines associated with the aggregate into the atmosphere, the paving compositions having uniform compaction due to even temperature of the asphalt-coated aggregate on discharge, comprising:
- providing an inclined drum mixer having a confined travel path between an upper charge end and a lower discharge end,
- combusting an air-fuel mixture at the charge end of the drum mixer,
- moving the hot combustion gases through the confined travel path in the drum mixer from the upper charge end to the lower discharge end at a rate of from 600 to 1500 feet per minute,
- conveying an unconditioned aggregate at substantially ambient temperature having about 1% to 10% water based on the weight of the aggregate associated therewith to the charge end of the drum mixer,
- contacting the conveyed aggregate with the liquefied asphalt composition substantially simultaneously on introduction of the conveyed aggregate into the charge end of the drum mixer, the liquefied asphalt composition initially capturing the fines in the aggregate, and
- tumbling and cascading the aggregate-liquefied asphalt mixture through the heated gas stream along substantially the total length of the confined travel path of the mixture to uniformly coat the aggregate with the liquefied asphalt composition, the fines associated with the aggregate adhering to larger asphalt-coated aggregate and not becoming entrained in the heated gas stream for discharge as an air pollutant.

References Cited

UNITED STATES PATENTS

| | | | |
|---|---|---|---|
| 1,240,481 | 9/1917 | Popkess | 259—158 |
| 2,028,745 | 1/1936 | Hendrick | 259—157 |
| 2,188,798 | 1/1940 | Smith | 259—155 |
| 3,423,222 | 1/1969 | McConnaughay | 106—278 |
| 3,614,071 | 10/1971 | Brock | 259—3 |
| 3,693,945 | 9/1972 | Brock | 259—158 |

JOSEPH L. SCHOFER, Primary Examiner

H. J. LILLING, Assistant Examiner

U.S. Cl. X.R.

106—273 B, 283, 284; 259—3, 147, 155, 158